(12) United States Patent
Hernandez-Marti et al.

(10) Patent No.: US 7,259,689 B2
(45) Date of Patent: Aug. 21, 2007

(54) TRANSMITTING POWER AND TELEMETRY SIGNALS ON A WIRELINE CABLE

(75) Inventors: Ramon Hernandez-Marti, Houston, TX (US); Ravicharan Mydur, Fortworth, TX (US); Paul J. Beguin, Houston, TX (US)

(73) Assignee: Schlumberger Technology Corp, Sugarland, TX (US)

( * ) Notice: Subject to any disclaimer, the term of this patent is extended or adjusted under 35 U.S.C. 154(b) by 399 days.

(21) Appl. No.: 11/056,840

(22) Filed: Feb. 11, 2005

(65) Prior Publication Data

US 2006/0187084 A1    Aug. 24, 2006

(51) Int. Cl.
*G01V 3/00* (2006.01)

(52) U.S. Cl. .............................. 340/855.1; 340/854.9; 367/25

(58) Field of Classification Search ............. 340/855.1, 340/854.9; 367/25
See application file for complete search history.

(56) References Cited

U.S. PATENT DOCUMENTS

| | | | | |
|---|---|---|---|---|
| 3,603,923 A | * | 9/1971 | Nelligan | 340/854.9 |
| 6,297,455 B1 | | 10/2001 | Wijnberg et al. | 174/113 |
| 6,469,636 B1 | * | 10/2002 | Baird et al. | 340/854.9 |
| 6,469,969 B2 | | 10/2002 | Carson et al. | 369/59.12 |
| 6,600,108 B1 | | 7/2003 | Mydur et al. | 174/120 |
| 7,026,951 B2 | * | 4/2006 | Bailey et al. | 340/854.3 |
| 7,154,412 B2 | * | 12/2006 | Dodge et al. | 340/854.9 |

* cited by examiner

*Primary Examiner*—Timothy Edwards, Jr.
(74) *Attorney, Agent, or Firm*—Dave Cate; Jaime Castano; Dale Gaudier

(57) ABSTRACT

A wireline logging assembly includes a cable having primary conductors, secondary conductors, and a central conductor. A first power source excites the primary conductors using a first propagation mode. A first telemetry transceiver excites the primary conductors using a second propagation mode orthogonal to the first mode. A second power source excites the secondary conductors and a second telemetry transceiver excites the central conductor. In one embodiment, the diameter of the primary conductors is greater than a diameter of the secondary conductors. The primary conductor includes four primary conductors symmetrically positioned around the center conductor and the secondary conductors include a secondary conductor positioned in the interstice between each pair of adjacent primary conductors. The first telemetry transceiver is preferably connected to a primary winding of a first transformer while the first power source is connected to center taps of the first and second secondary windings of the first transformer.

21 Claims, 6 Drawing Sheets

TRANSMITTING POWER AND TELEMETRY SIGNALS ON A WIRELINE CABLE

BACKGROUND

1. Field of the Present Invention

The present invention is in the field of signal transmission and, more particularly, transmission of power and telemetry signals over a wireline cable.

2. History of Related Art

Wireline cables are used for oil well logging operations in the field of energy related services. Wireline logging refers to lowering instruments at the end of a cable into a well bore. The instruments are designed to take measurements related to the geology and other petroleum related properties of oil wells. Typically, wireline logging includes powering various electrical sensors and actuators by a multi-conductor cable that is commonly referred to as a wireline cable.

Historically, wireline cables have been implemented with six isolated copper connectors helically wound around a center conductor (sometimes referred to as the heptacable). The heptacable cable structure was surrounded by two layers of steel wires. Techniques for transmitting multiple power signals using orthogonal propagation modes over cables of this type have been disclosed. Baird (U.S. Pat. No. 6,469,969), for example, describes a heptacable implementation and a method of transmitting multiple signals over it.

Recent advances in the design of wireline cables have resulted in cables capable of transmitting significantly more power than the conventional heptacable. Wijnberg (U.S. Pat. No. 6,297,455) [hereinafter Wijnberg], for example, describes a wireline cable having four relatively large primary conductors and at least one relatively small secondary conductor. Layered dielectric construction, such as that disclosed by Mydur et al. (U.S. Pat. No. 6,600,108), produces higher voltage ratings without degrading telemetry characteristics. It would be desirable to implement a method and system for transmitting power and telemetry signals over these types of wireline cables that takes advantage of their distinctive characteristics. It would be further desirable if the implemented solution were backwards compatible with conventional wireline cables.

SUMMARY OF THE INVENTION

The identified objectives are addressed by a wireline logging assembly that includes a cable having primary conductors, secondary conductors, and a central conductor. A first power source excites the primary conductors using a first propagation mode. A first telemetry transceiver excites the primary conductors using a second propagation mode orthogonal to the first mode. A second power source excites the secondary conductors and a second telemetry transceiver excites the central conductor. In one embodiment, the diameter of the primary conductors is greater than a diameter of the secondary conductors. The primary conductors include four primary conductors symmetrically positioned around the center conductor and the secondary conductors include a secondary conductor positioned in the interstice between each pair of adjacent primary conductors. The first telemetry transceiver is preferably connected to a primary winding of a first transformer while the first power source is connected to center taps of the first and second secondary windings of the first transformer.

BRIEF DESCRIPTION OF THE DRAWINGS

Other objects and advantages of the invention will become apparent upon reading the following detailed description and upon reference to the accompanying drawings in which.

Figure 1:
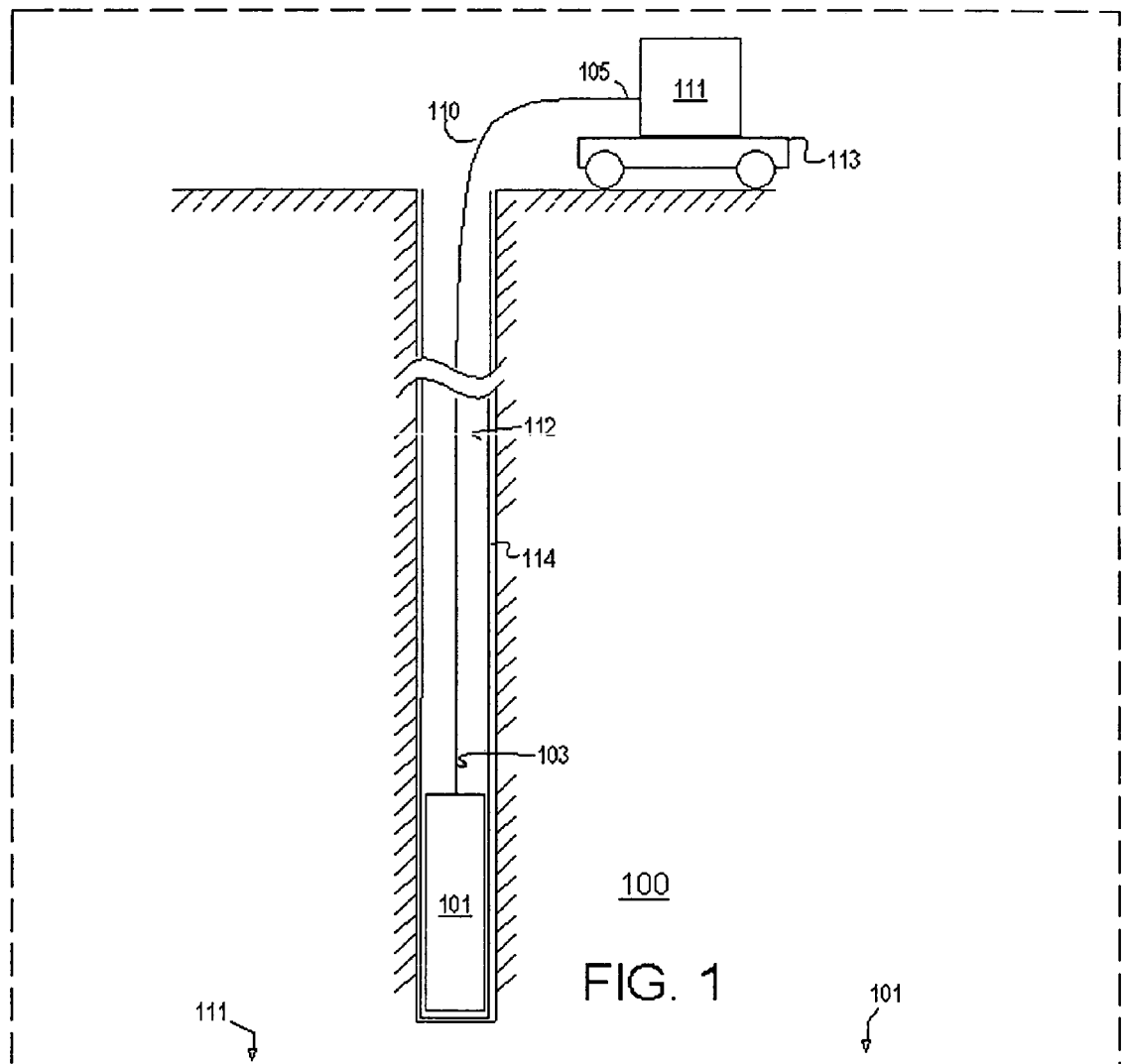
FIG. 1 depicts selected elements of a wireline logging system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention encompasses a system, method, and wireline logging arrangement suitable for transmitting multiple power signals and multiple telemetry signals over a wireline cable. The cable may be of a type that includes a first set of conductors having a first diameter (the primary conductors) and a second set of conductors (the secondary conductors) having a second diameter. In one embodiment, a high power signal is transmitted over the cable using the primary conductors excited using a high power propagation mode while a low power signal is transmitted over the cable using secondary conductors excited using a low power propagation mode. A first telemetry signal is transmitted over the primary conductors using a first telemetry mode that is orthogonal to the high power propagation mode. A second telemetry signal is transmitted using a center conductor in a secondary telemetry mode. The invention further encompasses transmitting power and telemetry signals over a conventional wireline cable, such as the heptacable. In this embodiment, a first set of the conductors in the heptacable are used to transmit the high power signal and the first telemetry signal, a second set of the conductors (generally comprising fewer conductors than the first set of conductors) are used to transmit the low power signal and a center conductor is used to transmit the second telemetry signal.

Turning now to the drawings, FIG. 1 depicts selected elements of a wireline logging system 100 suitable for implementing the present invention. Wireline logging system 100 includes a tool string 101 connected to a distal end 103 of a wireline cable 110 that is inserted into a well bore 112. Casing 114 may line some or all of the well bore 112. A proximal end 105 of wireline cable 110 is connected to a surface unit 111 positioned on a truck 113 at the surface of well bore 112. Well bore 112 and wireline cable 110 may extend to a depth of 10,000 meters or more below the surface.

Tool string 101 includes logging tools for taking various measurements of the earth adjacent well bore 112. These logging tools may include gamma-ray emitters/receivers, caliper devices, resistivity-measuring devices, neutron emitters/receivers, and the like, which are used to sense characteristics of the formations adjacent the well. Wireline cable 110 connects tool string 101 with one or more electrical power sources and data analysis equipment at the earth's surface, as well as providing structural support to tool string 101 as it is lowered and raised through well bore 112.

Figure 2:
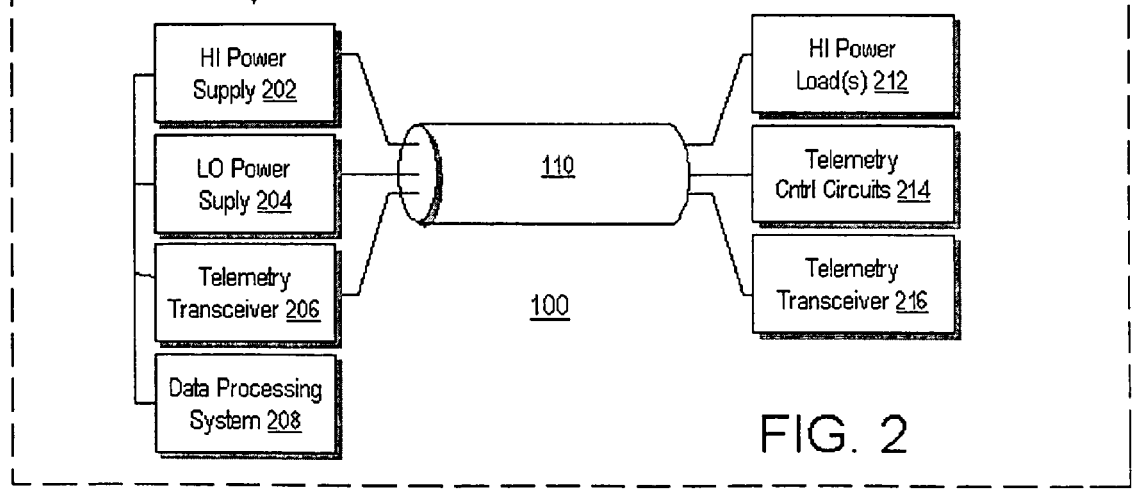
FIG. 2 depicts additional detail of selected elements of the wireline logging system of FIG. 1.

Referring now to FIG. 2, additional details of selected elements of wireline logging system 100 are depicted. In FIG. 2, surface unit 111 is shown as including a data processing system (computer) 208 connected to a first power supply referred to herein as the high power supply 202, a second power supply referred to herein a low power supply 204, and a telemetry transceiver 206. In one embodiment, the high power supply 202 is primarily used to power motors, actuators, and the like in tool string 101 while the low power supply 204 is used to power telemetry and control circuits down hole. In one embodiment suitable for use with a 13 mm implementation of wireline cable 110, high power supply 202 may produce a voltage of approximately 1000 Vrms (1000 Vdc to 1400 Vdc) while low power supply 204 may produce a voltage of approximately 500 Vrms (500 Vdc to 900 Vdc). The surface telemetry and control transceiver 206 is controlled by data processing system 208 to communicate control instructions and data to the down hole telemetry and control transceiver 216.

Tool string 101 includes motors, actuators, and other electrical and electro-mechanical devices generally referred to herein as high power loads 212, telemetry and control circuits 214 and the down hole telemetry and control transceiver 216. In one embodiment, high power loads 212 are powered by the high power supply 202 while telemetry and control circuits 214 are powered by lower power supply 204. Generally speaking, data processing system 208 uses power supplies 202 and 204 and transceiver 206 to control the application of power and control signals to the devices in tool string 101 for the purpose of causing tool string 101 to take a series of measurements. The measurements taken are most likely indicative of characteristics or conditions within the earth adjacent well bore 112. The measurements are communicated from down hole to the surface using the down hole and surface transceivers 216 and 206 respectively.

Figure 3:
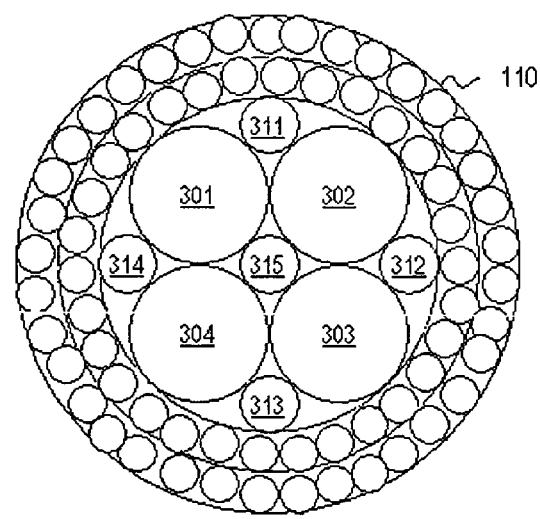
FIG. 3 is a cross section of a first prior art wireline cable suitable for use in the present invention.

Turning now to FIG. 3, a cross sectional view of wireline cable 110 according to one embodiment of the invention is depicted. In this embodiment, the configuration of wireline cable 110 may include some or all of the features of the wireline cable described in Wijnberg. Specifically, the depicted implementation of cable 110 includes a set of four primary conductors 301 through 304, a set of four secondary conductors 311 through 314 positioned at outer interstices between adjacent pairs of primary conductors, and a center conductor 315 surrounded by primary conductors 301-304.

In the depicted implementation, primary conductors 301-304 all have a first diameter while secondary conductors 311-314 have a second diameter that is less than the first diameter. Center conductor 315 has a diameter that may be equal to the diameter of the secondary conductors 301-304. Primary conductors 301-304 are preferably used to transmit power and data along wireline cable 110. Primary conductors 301-304 are preferably insulated conductors arranged in a cross pattern extending about a longitudinal axis of wireline cable 110. At any given cross section of the preferred implementation of wireline cable 110, primary conductors 301-304 are symmetrically located around the cable's longitudinal axis in a square configuration. Primary conductors 301-304 are preferably made of large stranded copper or copper alloy conductors that are preferably insulated with a thermoplastic or thermoset material such as, for example, Teflon. In a 13 mm embodiment of wireline cable 110, the primary conductors 301-304 preferably have a voltage rating of 1000 Vrms (1000 to 1400 Vdc) and a current rating of approximately 4.1 A (each) for continuous operation.

Secondary conductors 311-314 may also transmit power and/or data when needed and facilitate backward compatibility with a legacy cables such as the heptacable. Secondary conductors 311-314 are insulated conductors extending about and along the cable longitudinal axis. Secondary conductors 311-314 are preferably twisted together with primary conductors 301-314 and partially nested in outer interstices defined by primary conductors 311-314. At any given cross section of wireline cable 110, secondary conductors 301-304 are symmetrically located in a cross pattern with two sets of two diametrically opposed secondary conductors. Center conductor 315 extends along the longitudinal axis, wrapped by primary conductors 301-304. Secondary conductors 311-314 and center conductor 315 are made of small stranded copper or copper alloy conductors. These conductors are preferably insulated with a thermoplastic or thermoset material similar to the primary conductors. In a 13 mm embodiment of wireline cable 110, the second conductors 311-314 preferably have a voltage rating of approximately 500 Vrms (500 to 900 Vdc) and a current rating of approximately 1 A (each) for continuous operation.

Figure 4:
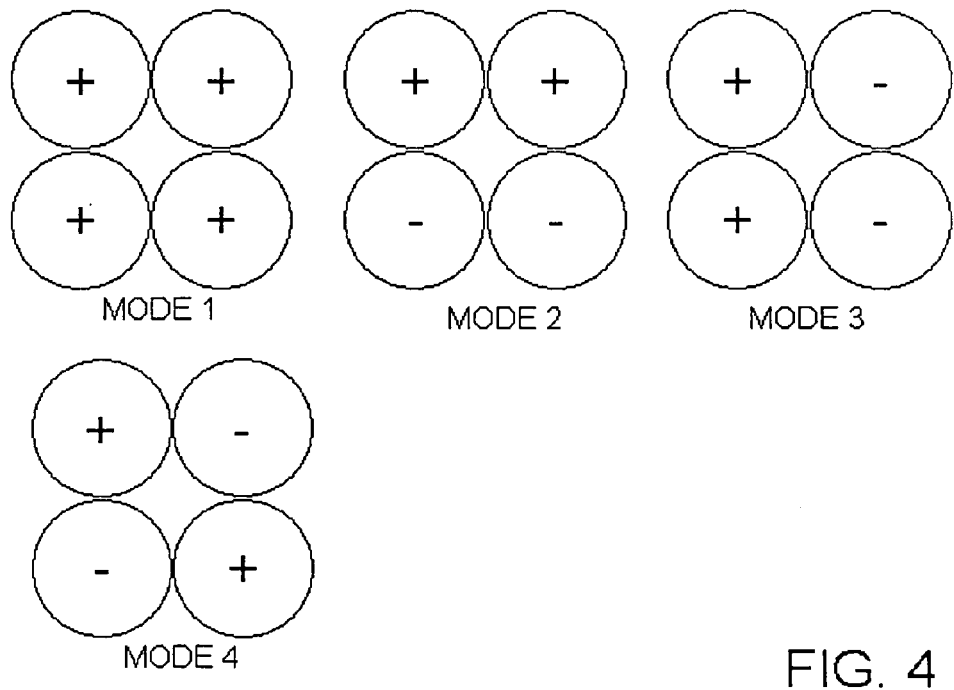
FIG. 4 depicts natural propagation modes of the primary conductors of the wireline cable depicted in FIG. 3.

Referring now to FIG. 4, natural propagation modes of the primary conductors 301-304 of FIG. 3 are conceptually illustrated. In a first propagation mode (MODE 1), all four primary conductors are excited by the signal being transmitted. MODE 1 implies that a return path for the signal is provided either via the cable armor (which typically includes two rows of steel conductors or through the center conductor 315. The second propagation mode (MODE 2) is achieved when the signal is excited along the first and second primary conductors 301 and 302 while primary conductors 303 and 304 are used for a return path. The third propagation mode (MODE 3) is achieved by exciting the primary conductors 301 and 304 with a signal and using conductors 302 and 303 for the return path. The fourth propagation mode (MODE 4) refers to exciting the first and third primary conductors 301 and 303 and using conductors 302 and 304 for return paths.

The propagation modes depicted in FIG. 4 are said to be orthogonal propagation modes. The significance of orthogonal propagation modes for purposes of the present invention is that signals propagated over wireline cable 110 using two different orthogonal propagation modes will generate significantly less cross talk than signals that are propagated using propagation modes that are not orthogonal. Orthogonal propagation modes thus enable two (or more) different signals to share a transmission path (i.e., share the same conductors within a cable).

Figure 5:
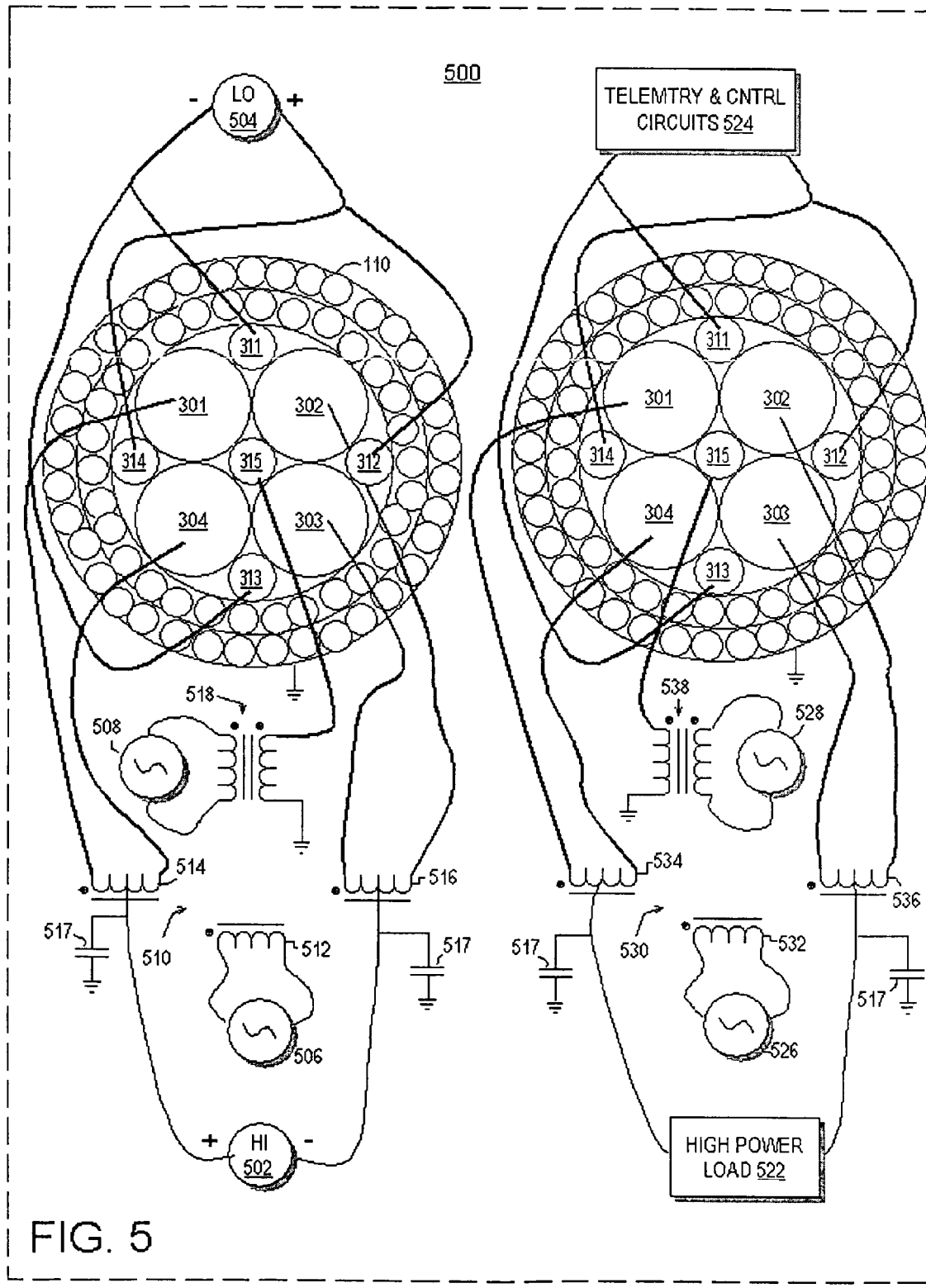
FIG. 5 depicts a method of transmitting power and telemetry signals over a wireline cable according to one embodiment of the present invention.

Referring now to FIG. 5, a method and assembly 500 for transmitting signals over a wireline cable according to one embodiment of the invention are depicted. In the depicted embodiment, assembly 500 facilitates the transmission of multiple power signals and multiple telemetry signals over an embodiment of wireline cable 110 such as that disclosed in FIG. 3. Generally, method and arrangement 500 propagate a high power signal over the primary conductors using a first propagation mode and a first telemetry signal over the primary conductors using a second propagation mode that is orthogonal to the first propagation mode. A second power signal is propagated over the set of secondary conductors while a second telemetry signal is delivered via the center conductor using the primary conductors (through capacitors on the transformer center taps) as a return path.

FIG. 5 depicts assembly 500 in two parts. The elements depicted on the left side of FIG. 5 represent the configuration at the source device 111 (of FIG. 1) while the elements depicted on the right side of FIG. 5 represent the configuration at the tool string 101 (of FIG. 1). This convention is followed throughout this disclosure.

The embodiment depicted in FIG. 5 includes a high power supply 502 and a low power supply 504. High and low power supplies 502 and 504 may be implemented as either DC or AC power sources (i.e., either source may provide either DC or AC current). As implied by their names, high power supply 502 generally delivers more power down hole than low power supply 504. Because the embodiment of wireline cable 110 depicted in FIG. 3 includes primary conductors and secondary conductors having different cross sectional areas and because it is well known that, other things being equal, conductors having larger areas can accommodate greater current than conductors having smaller areas, the preferred implementation is to provide high power via the primary conductors 301-304 and the low power via second conductors 311-314.

While it is theoretically possible to deliver multiple power signals down hole using shared transmission paths using orthogonal propagation modes, little if any benefit results from such an arrangement because voltages and currents add (in a vector way) and the total power deliverable is limited by the physics of the conductors. Thus, while the high and low power signals may share a transmission path, the preferred implementation uses distinct transmission paths for the two signals. Similarly, although additional power signals may be delivered, any such additional signal would necessarily share a transmission path with either the high power source 502 or the low power source 504 and would not generally provide additional benefit. To the contrary, decoupling shared power signals would require additional transformers or, in the case of DC currents, potentially complicated interface circuits to generate and decouple the power signals.

In the depicted embodiment, the primary conductors 301-304, in addition to providing the transmission path for high power source 502, also provide a transmission path for a first telemetry signal. Accommodating the high power source signal and a first telemetry signal is achieved by exciting the shared path using orthogonal propagation modes. Referring also to FIG. 4, the orthogonal propagation modes for symmetrically arranged conductors under a shield are shown. Mode 1 is not desirable for delivering high power signal because using cable armor for the return path represents a potential safety and reliability issue. Modes 2 and 3 are equivalent (i.e., Mode 3 results from rotating the cable 90 degrees). Mode 4 has a better high frequency response than modes 2 or 3 because of its superior distribution of magnetic fields. As such, a preferred implementation of assembly 500 is to deliver the first telemetry signal over primary conductors 301-304 using propagation Mode 4 while delivering the high power signal over said primary conductors using propagation Mode 3.

The implementation depicted in FIG. 5 shows such a configuration. To achieve the sharing of primary conductors 301-304 as a transmission path, the depicted implementation of assembly 500 includes a transformer 510 having a primary winding 512 and a pair of secondary windings 514 and 516. The turns ratio between primary winding 510 and secondary windings 514 and 516 is shown as unity.

A first telemetry transceiver 506 (represented as an AC voltage source) is connected to primary 512. The positive electrode of first transformer secondary 514 (indicated by the dot) is connected to primary conductor 301 while the return electrode for first transformer secondary 514 is connected to primary conductor 304. The positive electrode of second transformer secondary 516 is connected to primary conductors 302 while the return electrode is connected to primary conductor 303. In this configuration, first telemetry transceiver 506 excites primary conductors 301-304 using propagation Mode 4 because the active conductors (those conductors connected to the positive electrodes) and the return conductors (those conductors connected to the return electrodes) are arranged in an alternating pattern.

High power source 502 is shown as being connected to center taps in the first and second secondary windings of transformer 510. Specifically, a positive electrode of high power source 502 is connected to the center tap of first transformer secondary 514 while the return electrode of high power source 502 is connected to the center tap of second transformer secondary 516. In this configuration, the signal produced by high power source 502 is delivered in parallel to the primary conductors (301 and 304) connected to first transformer secondary 514. Similarly, the return path for the high power signal is the parallel combination of the primary conductors (302 and 303) connected to second transformer secondary 516. Delivering the high power signal using two primary conductors arranged in parallel doubles the deliverable current. Capacitors 517 close the return path for the second telemetry mode over the primary conductors.

In the depicted embodiment, the low power signal produced by low power source 504 is delivered down hole using the secondary conductors 311-314 as the transmission path. Again, maximum power is delivered down hole by paralleling the conductors. Specifically, the positive electrode of low power source 504 is connected in parallel to a pair of secondary conductors 312 and 314 while the return path is connected to secondary conductors 311 and 313. This "crossed" connection for the low power signal is desirable to balance the coupling to the primary conductors 301-304 and preserve orthogonality with the propagation modes employed for the high power signal and the first telemetry signal.

While it is possible to deliver a telemetry signal using secondary conductors 311-314 as a transmission path, the configuration of wireline cable 110 as depicted in FIG. 5 is not ideal for transmitting telemetry signals along this path. The distance between adjacent secondary conductors and the proximity of the secondary conductors to the shield make secondary conductors 311-314 less desirable for transmitting high frequency signals or signals requiring significant bandwidth.

A secondary or complementary telemetry path is provided using the center conductor 315. In the embodiment depicted in FIG. 5, a telemetry transceiver 508 is connected to the primary winding of a transformer 518. A secondary winding of transformer 518 is connected between center conductor 315 and ground. Although transformer 518 is not strictly required, it is desirable to provide additional isolation between the signal circuits and the high power conductors.

In practice, the ground connection of secondary winding of transformer 518 refers to a connection to the armor or shield 318 of wireline cable 110. Thus, the secondary winding of transformer 518 is connected between the center conductor 315 and the cable armor 318. In this configuration, telemetry transceiver 508 transmits the corresponding telemetry signal using a modified form of propagation Mode 1 of FIG. 4. Instead of exciting the four primary conductors 301-304, however, telemetry transceiver 508 excites center conductor 315. Capacitors 517 connected to center taps of secondary windings 514 and 516 close the loop for the propagation mode return over the primary conductors without shorting out the currents produced by high power source 502.

The symmetrical configuration of primary conductors 301-304 around center conductor 315 preserves orthogonality between this secondary telemetry signal and the signals provided via primary conductors 301-304, which use propagation Mode 2 and Mode 4. The modified Mode 1 signal exhibits coaxial-like frequency response characteristics limited primarily by the small diameter of center conductor 315, which also prevents center conductor 315 from being used as a transmission path for an additional power signal.

The right hand side of FIG. 5 depicts the down hole configuration of this embodiment. Telemetry transceiver 526 communicates with telemetry transceiver 506 at the surface using the primary conductors 301-304 while telemetry transceiver 528 is coupled to telemetry transceiver 508 via center conductor 315. The high power supply 502 provides power to motors, actuators and other devices collectively indicated in FIG. 5 as high power load 522 while the low power supply 504 provides the power source for down hole microelectronics referred to in FIG. 5 as telemetry and control circuits 524.

The wireline cable 110 depicted in FIG. 5 is also suitable for transmitting signals between down hole tool strings. More specifically, the depicted embodiment of wireline cable 110 is suitable for transmitting a high power signal and a high frequency signal between tools over relatively short distances (i.e., less than 10-15 meters). In this application, a high power signal might be transmitted over primary conductors 301-304 using, as an example, propagation Mode 2 while the high frequency signal (frequency exceeding 1 MHz) is transmitted over secondary conductors 311-315 using propagation Mode 4.

Figure 6:
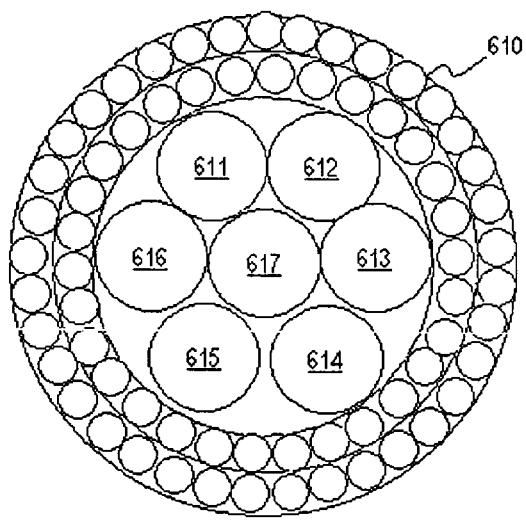
FIG. 6 is a cross section of a second prior art wireline cable suitable for use in the present invention.
Figure 7:
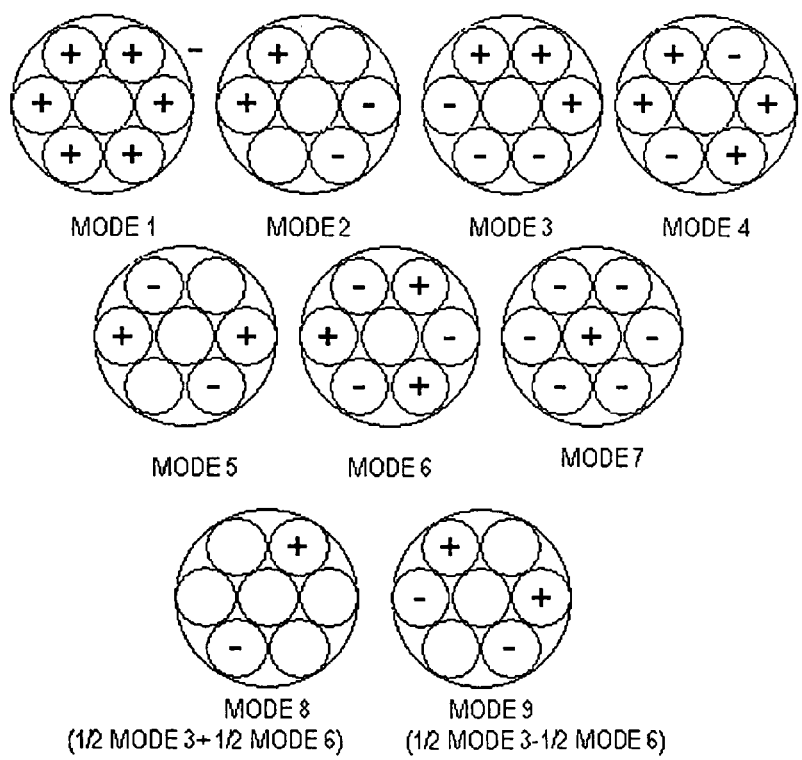
FIG. 7 illustrates natural propagation modes of the cable of FIG. 6.

Assembly 500 is shown as implemented with the wireline cable 110 depicted in FIG. 3. Compatibility issues make it beneficial, however, to implement an analogous method and system for providing power and telemetry signals across a legacy wireline cable such as the heptacable. An embodiment of a heptacable 610 is shown in FIG. 6. In this embodiment, heptacable 610 includes a set of seven conductors 611-617 where six of the conductors 611-616 are symmetrically positioned about a central conductor 617. In the depicted embodiment, each of the seven conductors 611-617 are equal in diameter. Seven mutually orthogonal propagation modes for heptacable 610 are depicted in FIG. 7 where the "-" symbol of Mode 1 indicates the shield is used for return and where e 8 and Mode 9 are derived from linear combinations of Mode 3 and Mode 6. Mode 7 is a modified form of Mode 1 in which excitation is applied to the central conductor 617 instead of exciting the six conductors 611-616, using said conductors as return.

The present invention encompasses a wireline logging assembly, compatible with wireline logging assembly 500, suitable for transmitting power and telemetry signals over a heptacable. In this embodiment, assembly 800 provides high power signal using four of the conductors while providing the low power signal using a pair of diametrically opposed conductors.

Figure 8:
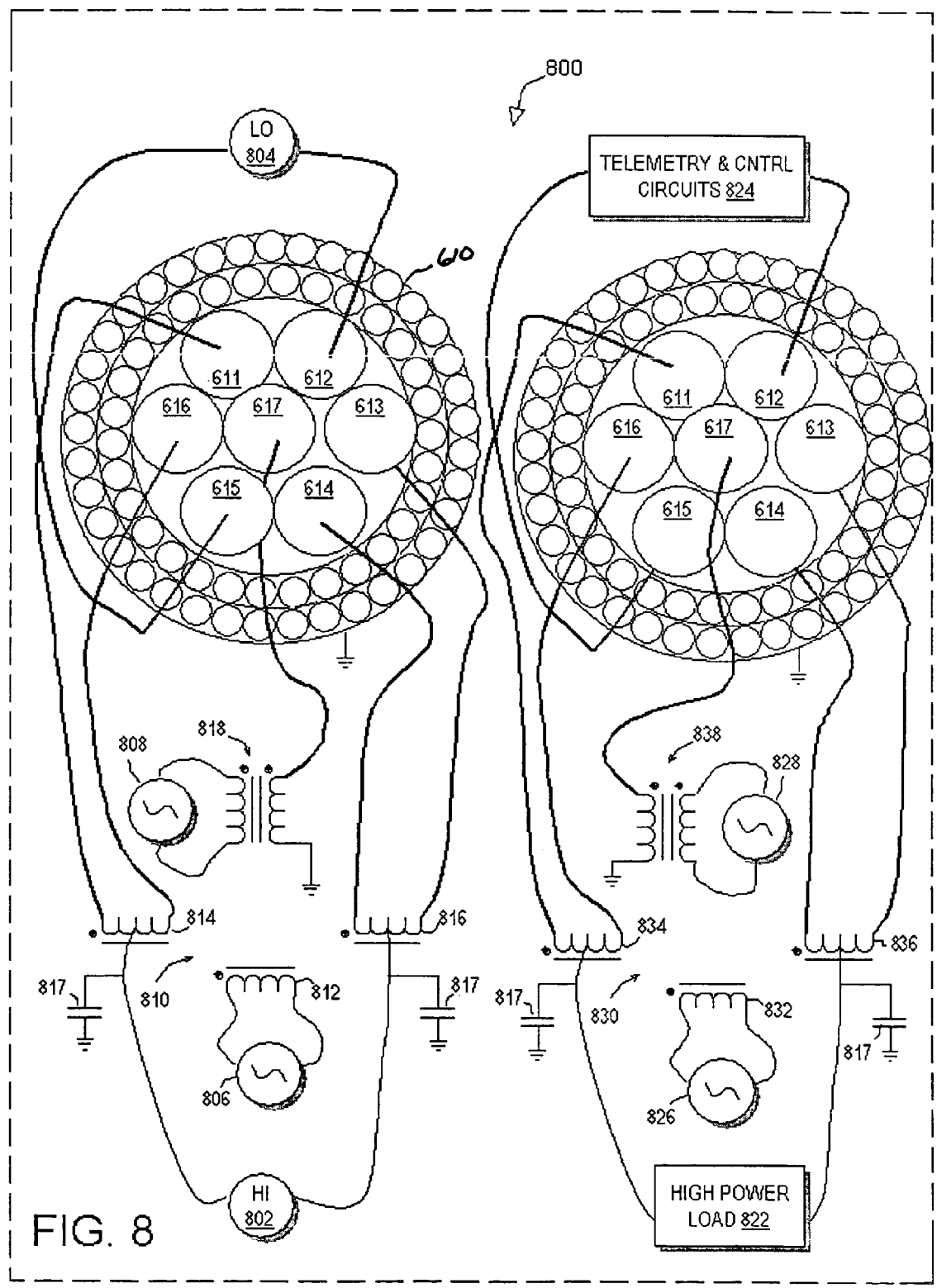
FIG. 8 depicts a method and arrangement for transmitting power and telemetry signals over the wireline cable of FIG. 6 according to one embodiment of the invention.

Referring now to FIG. 8, a wire logging assembly 800 for use with heptacable 610 according to one embodiment of the present invention is depicted. Analogous to assembly 500 depicted in FIG. 5, the surface components of assembly 800 (shown on the left side of FIG. 8) include a high power supply 802, a low power supply 804, a first telemetry transceiver 806, and a second telemetry transceiver 808. Telemetry transceiver 806 is connected to the primary winding 812 of a transformer 810 while telemetry transceiver 808 is connected to the primary of a transformer 818. The high power supply 802 is connected to center taps of secondary windings 814 and 816 of transformer 810. Capacitors 817 close the return path for the secondary telemetry mode over the primary conductors.

The down hole components of assembly 800 (shown on the right side of FIG. 8) include a high power load 822, telemetry and control circuits 824, a first telemetry transceiver 826 and a second telemetry transceiver 828. Telemetry transceiver 826 is connected to the primary winding 832 of a transformer 830 while telemetry transceiver 828 is connected to the primary of a transformer 838. The high power load 822 is connected to center taps of secondary windings 834 and 836 of transformer 830.

The telemetry signal provided by transceiver 806 is transmitted using propagation Mode 5 (FIG. 7) over conductors 611, 613, 614, and 616 while the high power signal generated by high power source 802 is transmitted using propagation Mode 2 over the same set of conductors. The low power signal is applied to conductors 612 and 615 using propagation Mode 8. The secondary telemetry signal is transmitted over the central conductor 617 in propagation Mode 7 using the remaining conductors for return. Capacitors 817 connected to center taps of secondary windings 814 and 816 close the loop for the propagation mode return over the primary conductors without shorting out the currents produced by high power source 802. Low power source 804 should contain capacitors like 817 between each of its electrodes and ground for the same purpose.

Figure 9:
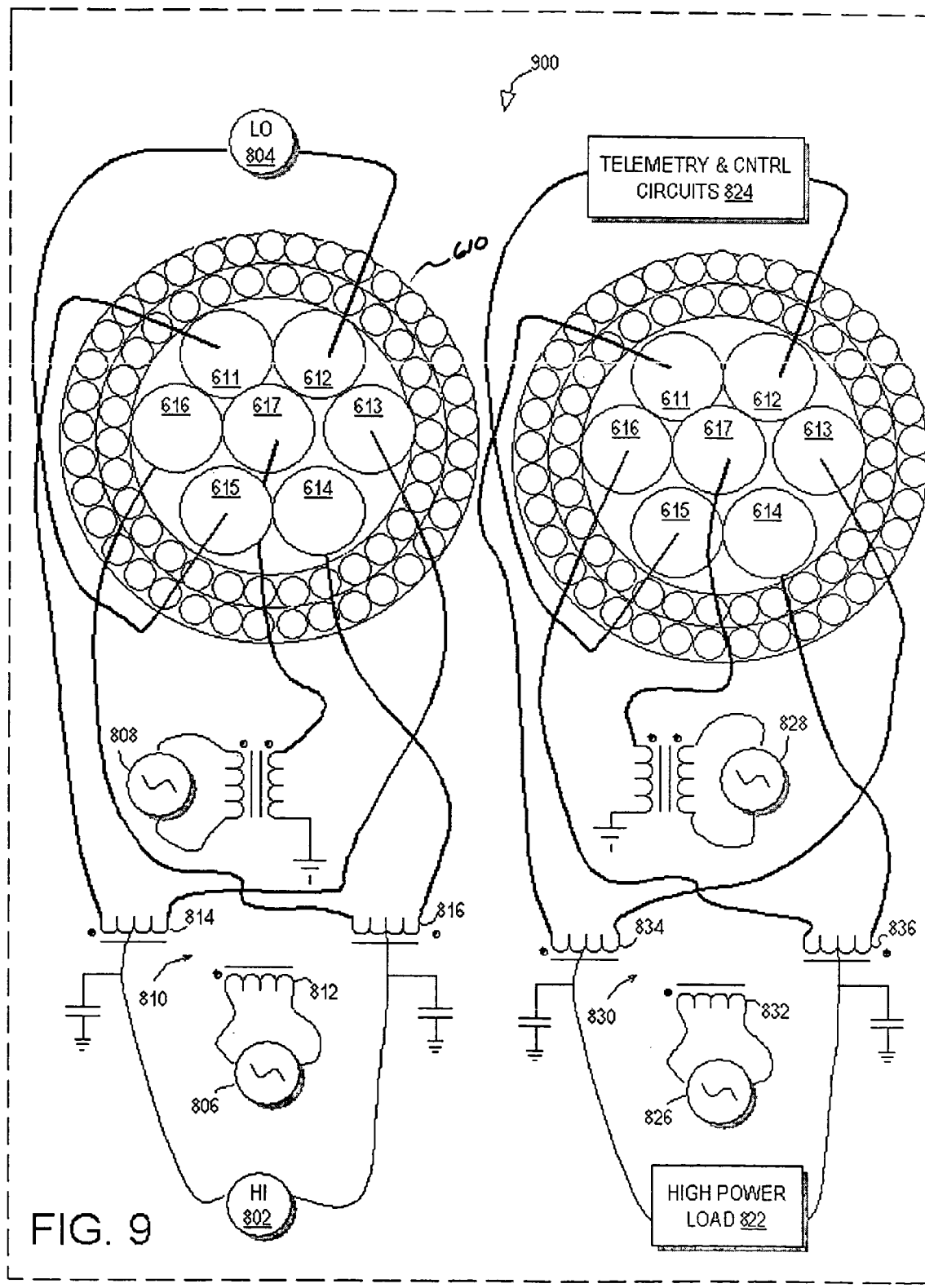
FIG. 9 depicts an alternative method and arrangement for transmitting power and telemetry signals over the wireline cable of FIG. 5 according to an embodiment of the present invention.

An alternative embodiment of the heptacable implementation is shown as assembly 900 depicted in FIG. 9. In this embodiment, with the return electrode of secondary winding 814 connected to conductor 613 and the return electrode of secondary winding 616, assembly 900 differs from assembly 800 in that high power supply 802 (like telemetry transceiver 806) transmits the high power signal using Mode 9. This configuration uses a combination of Mode 3 and Mode 6 to transmit the high power signal and the low power signal. As such, the two power signals might undesirably cross talk such that disturbances on the low power conductors may cause disturbances on the high power conductors and vice versa.

It will be apparent to those skilled in the art having the benefit of this disclosure that the present invention contemplates a wireline logging system for transmitting multiple power signals and multiple telemetry signals over various wireline cable configurations. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A wireline logging assembly comprising:
   a cable including primary conductors, secondary conductors, and a central conductor;
   a first power source configured to excite a first end of the primary conductors using a first propagation mode;
   a first telemetry transceiver configured to excite the first end of the primary conductors using a second propagation mode wherein the second propagation mode is orthogonal to the first propagation mode; and
   a second power source configured to excite a first end of the secondary conductors; and
   a second telemetry transceiver configured to excite a first end of the central conductor.

2. The assembly of claim 1, wherein a diameter of the primary conductors is greater than a diameter of the secondary conductors.

3. The assembly of claim 2, wherein the primary conductors include four primary conductors symmetrically positioned around the center conductor and further wherein the secondary conductors include a secondary conductor positioned in the interstice between each pair of adjacent primary conductors.

4. The assembly of claim 1, wherein the first power source excites the primary conductors using a propagation mode in which a pair of adjacent primary conductors provide a return path for the first power source signal and wherein the first telemetry transceiver excites the primary conductors using a propagation mode in which a pair of opposite conductors provide a return path for the first telemetry signal.

5. The assembly of claim 1, wherein the first telemetry transceiver is connected to a primary winding of a first transformer and wherein the first power source is connected to center taps of the secondary windings of the first transformer.

6. The assembly of claim 5, wherein the second telemetry transceiver is connected to the primary winding of a second transformer and further wherein the secondary winding of the second transformer is the center conductor.

7. The assembly of claim 5, wherein the first transformer includes first and second secondary windings, wherein terminal of the first secondary winding are connected to a first pair of primary conductors and wherein terminals of the second secondary winding are connected to a second pair of primary conductors.

8. A wireline cable assembly, comprising:
   a set of primary conductors positioned around the circumference of a center conductor;
   a set of secondary conductors including a secondary conductor positioned in interstices between each pair of adjacent primary conductors, wherein a diameter of the secondary conductors and the center conductor are less than a diameter of the primary conductors;
   a first transformer including a primary winding and first and second secondary windings wherein terminals of the first secondary winding are connected to a first pair of the primary conductors and wherein terminals of the second secondary winding are connected to a second pair of the primary conductors;
   a first power supply connected to center taps in the first and second secondary windings; and
   a first telemetry transceiver connected to the primary winding of the first transformer.

9. The assembly of claim 8, wherein the set of primary conductors comprises a set of four primary conductors and the set of secondary conductors comprises a set of four secondary conductors and further wherein a diameter of the center conductor is less than the diameter of the primary conductors.

10. The assembly of claim 8, further comprising a set of capacitors connected between electrical ground and the center taps of the secondary windings of the first transformer.

11. The assembly of claim 8, further comprising a cable shield surrounding the primary, secondary, and center conductors, wherein the cable shield is connected to electrical ground.

12. The assembly of claim 8, further comprising, connected at a distal end of the cable, a first down hole transformer having a primary winding and first and second secondary windings, wherein the primary winding of the first down hole transformer is connected to a first down hole telemetry transceiver, and wherein center taps of the first and second secondary windings of the first down hole transformer are connected to a first down hole load.

13. The assembly of claim 8, further comprising a second power supply connected to the secondary conductors and a secondary telemetry transceiver configured to transmit a second telemetry signal over the center conductor.

14. The assembly of claim 13, further comprising a second transformer, wherein the second telemetry transceiver is connected to a primary winding of the second transformer and wherein a secondary winding of the second telemetry transceiver is connected to the center conductor.

15. A wireline assembly, comprising:
   means for exciting with a first power signal a set of primary conductors symmetrically positioned around a center conductor using a first propagation mode;
   means for exciting with a first telemetry signal the primary conductors using a second propagation mode wherein the second propagation mode is orthogonal to the first propagation mode;
   means for exciting with a second power signal a set of secondary conductors; and
   means for exciting with a second telemetry signal the center conductor.

16. The assembly of claim 15, wherein a diameter of the primary conductors is greater than a diameter of the secondary conductors.

17. The assembly of claim 16, wherein the primary conductors include four primary conductors symmetrically positioned around the center conductor and further wherein the secondary conductors include a secondary conductor positioned in the interstice between each pair of adjacent primary conductors.

18. The assembly of claim 15, wherein the first power signal means excites the primary conductors using propagation Mode 3 mode and wherein the first telemetry signal means excites the primary conductors using propagation Mode 4.

19. The assembly of claim 15, wherein the first telemetry signal means is connected to a primary winding of a first transformer and wherein the first power source signal means is connected to center taps of the secondary windings of the first transformer.

20. The assembly of claim 19, wherein:
   the second telemetry signal means is connected to the primary winding of a second transformer and further wherein a secondary winding of the second transformer is connected the center conductor; and the first transformer includes first and second secondary windings, wherein terminals of the first secondary winding are connected to a first pair of adjacent primary conductors and wherein terminals of the second secondary winding are connected to a second pair of adjacent primary conductors.

21. A method of transmitting power and telemetry signal comprising:

providing a cable in a wellbore, the cable including primary conductors, secondary conductors, and a central conductor;

using a first power source to excite a first end of the primary conductors at a first propagation mode;

using a first telemetry transceiver to excite the first end of the primary conductors at a second propagation mode wherein the second propagation mode is orthogonal to the first propagation mode; and using a second power source to excite a first end of the secondary conductors; and using a second telemetry transceiver to excite a first end of the central conductor.

* * * * *